United States Patent [19]

Rosenthal et al.

[11] 3,919,279

[45] Nov. 11, 1975

[54] CATALYTIC PRODUCTION OF ISOCYANATES FROM ESTERS OF CARBAMIC ACIDS

[75] Inventors: Rudolph Rosenthal, Broomall; John G. Zajacek, Strafford, both of Pa.

[73] Assignee: Atlantic Richfield Company, Los Angeles, Calif.

[22] Filed: June 26, 1974

[21] Appl. No.: 483,196

[52] U.S. Cl............................................. 260/453 P
[51] Int. Cl.².................................... C07C 118/00
[58] Field of Search............................... 260/453 P

[56] References Cited
UNITED STATES PATENTS

| | | | |
|---|---|---|---|
| 2,409,712 | 10/1946 | Schweitzer | 260/453 |
| 3,734,941 | 5/1973 | Sydor | 260/453 |

*Primary Examiner*—Lewis Gotts
*Assistant Examiner*—Dolph H. Torrence
*Attorney, Agent, or Firm*—Delbert E. McCaslin

[57] ABSTRACT

Method for the production of isocyanates from esters of carbamic acids (urethanes) by decomposing the ester in the presence of a heavy metal or inorganic or organic compound of the heavy metal or mixtures or combinations thereof at elevated temperatures while said ester is dissolved in a suitable inert solvent to produce the isocyanate and alcohol, the heavy metal catalyst may be as finely divided metal or mixture of metals and the heavy metal compound catalyst may be further characterized by being soluble under reaction conditions. This method gives increased decomposition rates as compared with thermal decomposition.

20 Claims, No Drawings

CATALYTIC PRODUCTION OF ISOCYANATES FROM ESTERS OF CARBAMIC ACIDS

BACKGROUND OF THE INVENTION

In a co-pending application Ser. No. 449,291, filed Mar. 8, 1974, entitled PRODUCTION OF ISOCYANATE FROM ESTERS OF CARBAMIC ACIDS (URETHANES) a process is disclosed for the production of isocyanate from urethanes in general by thermally decomposing the urethane while it is dissolved in a suitable inert solvent to produce the corresponding isocyanate and alcohol which are recovered separately. This application discloses the general method applicable to a wide variety of carbamic acids under both batch and continuous operations.

The present invention is applicable for converting the same esters of carbamic acids to isocyanates as disclosed in the described co-pending application but has the advantage of increasing the decomposition rate as compared with the thermal decomposition rates of the process of the co-pending application.

French Pat. No. 1,473,821 (1967) discloses a catalytic method for the production of isocyanates, however, this differs from the instant invention by the fact that it employs substituted ureas as the starting compound instead of urethanes and produces isocyanates and amines instead of isocyanates and alcohols.

A more recent British Pat. No. 1,247,451 (1971) proposes to pyrolyze diethyl toluene-2,4-dicarbamate in the presence of a Lewis acid such as ferric chloride to produce toluene-2,4-diisocyanate (TDI). In general, the reaction is carried out at 400°C. to 600°C. in the presence of the catalyst at subatmospheric pressures, i.e., vapor phase, with the vapors being condensed to recover the isocyanate product. Since recombination can occur readily in vapor phase only about a 50 mole percent yield is reported.

SUMMARY OF THE INVENTION

This invention relates to a method for producing isocyanates from carbamates by contacting the carbamate in an inert organic solvent for the carbamate with a catalytic amount of a heavy metal or inorganic or organic compound of the heavy metal and at elevated temperatures such that the carbamate decomposes into the corresponding isocyanate and alcohol.

It is an object of this invention, therefore, to provide a method to generate isocyanates from esters of carbamic acid.

It is another object of this invention to convert the esters of carbamic acids to isocyanates by the use of catalysts and elevated temperatures.

It is another object of this invention to catalytically decompose esters of carbamic acids in an inert solvent to produce high yields of the isocyanate.

It is another object of this invention to convert esters of dicarbamic acids in an inert solvent containing a heavy metal or compound of the heavy metal as the catalyst to produce the corresponding diisocyanate.

Other objects of this invention will be apparent from the description of the invention which follows and from the claims.

To attain the objectives of this invention, it has surprisingly been discovered that esters of carbamic acids can be decomposed to the isocyanate and corresponding alcohol with a high conversion in excellent yields in the presence of a heavy metal or heavy metal compound catalyst at elevated temperatures.

DESCRIPTION OF THE INVENTION

In accordance with this invention an isocyanate is produced from an ester of a carbamic acid. Representative carbamate starting materials may be characterized by the formulas $R(NHCOOR')_x$ or $(RNHCOO)_xR'$ wherein R is a substituted or unsubstituted mono-, di- or trivalent organic radical selected from saturated or monoolefinic unsaturated straight or branched chain aliphatic or cycloaliphatic radicals containing not more than 32 carbon atoms, alkoxyalkyl radicals having not more than 32 carbons with one or more ether linkages, aryl radicals, aralkyl radicals, and alkaryl radicals containing 1 to 5 rings which may be either condensed or non-condensed; R' is a substituted or unsubstituted mono-, di- or trivalent organic radical, preferably mono- or divalent, selected from saturated or monoolefinic unsaturated, straight or branched chain aliphatic or cycloaliphatic radicals containing not more than 32 carbon atoms, and preferably not more than 18 carbon atoms, similar alkoxyalkyl radicals, aryl radicals, aralkyl radicals and alkaryl radicals containing 1, 2 or 3 rings either condensed or non-condensed; and $x$ is 1, 2 or 3, each R or R' being the same or different, respectively, when x is 2 or 3.

Preferably R will be an organic aliphatic radical containing up to 18 carbon atoms for example, methyl, ethyl, propyl, isopropyl, butyl, isobutyl, amyl, isoamyl, neopentyl, the hexyls, the heptyls, the octyls, the nonyls, the decyls, and the like including the octadecyl, and the monoolefinic compounds such as propenyl, butenyl, pentyl, hexenyl, decenyl and the like including octadecenyl radicals. The divalent radicals such as ethylene, propylene, butylene amylene, hexylene, heptylene, octylene, nonylene, decylene and the like up to octadecylene also are included and likewise the trivalent radicals. These radicals may be hydrocarbyl or may be substituted with groups nonreactive with isocyanates, for example, nitro or halo, in particular chloro groups. Also included are the cycloaliphatic radicals containing from 5 to 7 carbon atoms preferably such as the cyclopentyl, cyclohexyl and cycloheptyl radicals, likewise the di- and trivalent corresponding radicals. The monounsaturated $C_5$ to $C_7$ cycloaliphatic radicals are also included as well as the substituted compounds wherein the substituent is a lower alkyl radical of 1 to 4 carbon atoms, or nitro, or halo such as chloro. The alkoxyalkyl radicals can range from the short chain such as methoxymethyl and ethoxyethyl to the longer chain radicals such as ethoxyethoxyethyl, propoxypropyl, butoxybutyl and the like up to 18 carbon atoms.

Likewise R can be an aryl radical such as the mono-, di- and trivalent radicals of benzene, toluene, naphthalene, diphenyl, anthracene, phenanthrene, terphenyl, naphthacene, and pentacene with the mono- and divalent radicals being particularly preferred. These aryl radicals can also be substituted with one or more lower alkyl groups preferably having from 1 to 4 carbon atoms or by radicals non-reactive with isocyanates such as nitro or halo, particularly chloro radicals. In addition to the alkaryl radicals, the aralkyl radicals, such as methyl, ethyl, propyl, and butyl radicals having a hydrogen substituted by phenyl, naphthyl, anthryl or phenanthryl radicals thus the lowest member of the group is methyl having a phenyl radical substituted for a hydrogen on the methyl giving a benzyl radical. Likewise more than one hydrogen may be substituted with a phenyl group as in diphenyl methane, the corresponding aralkyl radical being diphenylmethyl.

Preferably the R' of the above formula will be an organic radical containing up to 18 carbon atoms, i.e. the same alkyl radicals enumerated above for R, the same monoolefinic compounds enumerated for R the same alkoxyalkyl radicals enumerated for R and the same aryl radicals up to 3 rings enumerated for R.

Representative esters of carbamic acids as characterized above include ethyl phenylcarbamate (alternatively named ethyl N-phenylcarbamate or also the ethyl ester of carbanilic acid, or preferably ethyl carbanilate), butyl carbanilate, pentyl carbanilate, hexyl carbanilate, octyl carbanilate, ethylene dicarbanilate, 1,3-propylene dicarbanilate, 1,4-butylene dicarbanilate, 1,5-amylene dicarbanilate, 1,6-hexylene dicarbanilate, 1,8-octylene dicarbanilate, 1,10-decylene dicarbanilate, glyceryl tricarbanilate, ethyl 1-naphthalenecarbamate, ethyl 1-anthracenecarbamate, ethyl 2-anthracenecarbamate, ethyl 9-anthracenecarbamate, diethyl 9,10-anthracenedicarbamate, diethyl 1,5-anthracenedicarbamate, diethyl 5,6-naphthacenedicarbamate, diethyl 6,13-pentacenedicarbamate, ethyl paraphenylcarbanilate, ethylene bis(paraphenylcarbanilate), diethyl metabenzenedicarbamate, diethyl 1,5-naphthalenedicarbamate, methyl isopropylcarbamate, ethyl (methoxymethyl) carbamate, methyl sec-butylcarbamate, ethyl(3-chloropropyl) carbamate, methyl tertiary butylcarbamate, ethyl tert-octylcarbamate, diethyl tetramethylenedicarbamate, ethyl 1-ethyl-cyclohexanecarbamate, propyl (5,5-dimethylhexyl) carbamate, methyl para-toluenecarbamate, ethyl para-(trifluoromethyl) carbanilate, isopropyl meta-chlorocarbanilate, ethyl 2-methyl-5-nitrocarbanilate, ethyl 4-methyl-3-nitrocarbanilate, diethyl 4,4-methylenedicarbanilate, dimethyl meta-benzenedicarbamate, dimethyl toluene-2,4-dicarbamate, diethyl toluene-2,4-dicarbamate, dipropyl toluene-2,4-dicarbamate, diisopropyl toluene-2,4-dicarbamate, dibutyl toluene-2,4-dicarbamate, diamyl toluene-2,4-dicarbamate, dihexyl toluene-2,4-dicarbamate, diphenyl toluene-2,4-dicarbamate, di(phenylmethyl) toluene-2,4-dicarbamate, dinaphthyl toluene-2,4-dicarbamate, di(ethoxyethyl)toluene-2,4-dicarbamate, the corresponding esters of toluene 2,6-dicarbamate, diethyl 4-chloro-meta-benzenedicarbamate, methyl para-butoxy carbanilate, ethyl para-acetylcarbanilate, ethyl para-bromocarbanilate, ethyl ortho-nitrocarbanilate, isopropyl meta-(trifluoromethyl)carbanilate, triethyl 1,3,5-benzenetricarbamate and the like. These esters specifically named are obviously merely representative of the very large number of esters falling within the definition of the general formula for the compounds which can be converted to isocyanates by the method of this invention. In general, the methyl and ethyl esters are more readily available and therefore these are more preferred.

In carrying out the process of this invention the ester is added to a solvent, to be characterized completely hereinafter in an amount such that substantially all of the ester will be completely dissolved at the reaction temperature. The ester can either be added to the cold solvent and the mixture heated to reaction temperature, which method is generally employed in smaller scale batch runs, or the ester can be added to the heated solvent continuously as would be more feasible for commercial large scale operations.

The process can be carried out at temperatures ranging from 175°C. to 350°C. with a more preferred range being from 200°C. to 300°C. and the most preferred range being from 230°C. to 285°C. particularly for the dialkyl mononuclear aromatic dicarbamates.

The reaction time can vary from several minutes to several hours depending upon the particular ester of the carbamic acid being reacted and the reaction temperature employed. In general times ranging from 5 minutes to 4–6 hours are sufficient to obtain high conversions in batch runs, while in continuous runs, residence times of from 1 to 20 hours can be employed depending upon the desired degree of conversion.

The process is preferably carried out at atmospheric pressure when suitable high boiling solvents are employed, or it can be run at superatmospheric pressures when lower boiling solvents are used.

It is important in carrying out the process of this invention that the ester of the carbamic acid be substantially completely dissolved in the solvent at reaction temperature during conversion to the isocyanate and alcohol. If the alcohol is lower boiling than the isocyanate as is usually the case, then the alcohol can either be distilled from the solvent as formed or be removed by the assistance of an inert gas being passed through the solution such as through a fritted disc or similar means for dispersion or by the use of a lower boiling solvent meeting the same criteria as will be set forth hereinafter and boiling between the isocyanate and alcohol. By this means recombination of the alcohol and isocyanate is minimized. Moreover, since the reaction is carried out in solution the formation of polymerization products such as tars and resins is inhibited as well as the formation of undesirable by-products such as amines and carbon dioxide formerly associated with the thermal decomposition of esters of carbamic acids.

Alternatively if the alcohol is higher boiling than the generated isocyanate, the isocyanate can be removed overhead again by distillation or by the use of an inert gas or by the use of a suitable solvent also to be defined.

In a somewhat more sophisticated alternative which is preferred for continuous operation both the alcohol and isocyanate after formation in the solution are removed into the vapor phase either by the use of an inert gas or a suitable carrier solvent. The isocyanate and alcohol are then separated by suitable fractionation and/or partial condensation. When a solvent is employed to carry the products overhead, it can be used to assist in the condensation of either the isocyanate or alcohol.

The inert gases which can be employed include nitrogen, helium, argon, carbon dioxide, methane, ethane, propane and the like either alone or in mixture. Nitrogen is preferred because of its convenience.

The solvents which can be used in the process of this invention both in the reaction medium and for carrying the products overhead are compounds which meet certain criteria. The reaction medium solvent must be capable of dissolving the particular ester of the carbamic acid at reaction temperature to an extent sufficient to make the process practical. Thus if the ester were soluble in the reaction medium solvent to the extent of 1 weight per cent or less the process would be operable, but not particularly attractive from a commercial standpoint. Consequently, although the lower ester concentration limit might be considered to be about 1 weight per cent, it is preferred that the ester be soluble at least to from 3 to 5 weight per cent at reaction temperatures.

Since it is necessary in accordance with the objects of this invention to carry out the conversion of the ester of the carbamic acid in solution it is preferred that the concentration of the ester in the reaction medium solvent should not exceed from 70–80 weight per cent based on the weight of the solution.

Both the reaction medium solvent and the solvent employed to carry the reaction product or products overhead (the carrier solvent) must not decompose at the reaction temperature employed and in addition these solvents cannot contain active hydrogens which, of course, would react with the isocyanate produced. In general any compound containing reactive groups that combine with the isocyanate should not be employed as these solvents in this invention.

Therefore, the parameters for suitable solvents in this invention are (a) compounds that are solvents for the starting carbamate (b) compounds that are stable at the reaction temperature and (c) compounds that are nonreactive with the generated isocyanate.

In view of these criteria or parameters, the compounds which can be used as reaction medium solvents in this invention include aliphatic, cycloaliphatic or aromatic hydrocarbons or substituted hydrocarbons or mixtures thereof, and also certain oxygenated compounds such as ethers, ketones, and esters. Other oxygenated compounds such as alcohols and acids cannot be used because of their reactivity with the generated isocyanate. Water also must, of course, be excluded. The sulfur analogues of the ethers, ketones, and esters also can be employed. When operating at atmospheric pressure the boiling point of the solvent or solvent mixture should be at or above the desired operating temperature. Lower boiling solvents or mixtures of solvents can be used by employing superatmospheric pressures, however, since the reaction must be carried out in the liquid phase, the single solvent or solvent mixture cannot have a critical temperature below 175°C. (the minimum reaction temperature).

In general, the compounds preferred are the aromatic hydrocarbons having from 1 to 3 rings including the alkyl benzenes having from 1 to 15 carbon atoms in the alkyl group, the halo (particularly chloro) substituted and mono-nitro substituted aromatics; the aliphatic hydrocarbons having 4 to 32 carbon atoms, the substituted aliphatics such as the halo (particularly chloro and fluoro) and mono-nitro substituted $C_4$ to $C_{32}$ aliphatics, the cycloaliphatic hydrocarbons and lower alkyl substituted cycloaliphatic hydrocarbons, the oxygenated compounds selected from the group consisting of ethers, ketones and esters having from 4 to 32 carbon atoms and the sulfur analogues of these compounds.

Thus more specifically suitable compounds either for the reaction medium or carrier solvent include alkanes or monoalkenes having from 5 to as many as 32 carbon atoms which can be either straight or branched chain such as the pentanes, hexanes, heptanes, octanes, nonanes, decanes and on up to the higher alkanes such as n-hexadecane, n-octadecane, eicosane, squalane and the like and the corresponding monalkenes. Lower molecular weight compounds such as the $C_4$'s although having critical temperatures below 175°C. can be employed in conjunction with the compounds having critical temperatures above 175° C. provided that the mixture has a critical temperature above 175°C. The aromatics such as benzene, toluene, ortho-xylene, meta-xylene, para-xylene, mixtures of two or more of the xylenes, ethylbenzene, cumene, diisopropylbenzenes, dibutylbenzenes, naphthalene, lower alkyl substituted naphthalenes, substituted benzenes and substituted naphthalenes non-reactive with isocyanates such as the nitro or halogenated compounds for example, the chlorobenzenes, nitrobenzene, chloronaphthalenes and the like, diphenyl and substituted diphenyls, diphenyl methane, terphenyls, such as ortho-terphenyl, substituted terphenyls, anthracenes, phenanthrenes, and the like can be employed with equal utility. Likewise cycloaliphatic hydrocarbons such as cyclopentane methyl cyclopentane, 1,1-dimethyl cyclopentane, ethyl cyclopentane, cyclohexane, methyl cyclohexane, ethyl cyclohexane, cycloheptane and others of 5 to 7 carbon atoms.

Ethers (including cyclic ethers) and polyether solvents which do not contain a substituent group which would react with an isocyanate can also be used, likewise other oxygen containing compounds such as the ketones, for example methyl ethyl ketone, esters, for example dibutyl phthalate, dihexyl phthalate, dioctyl phthalate, and the like are suitable as are the sulfur analogues of these compounds.

In summary compounds meeting the criteria which have been set forth can be employed as the reaction medium solvent or carrier solvent since in order to meet the objectives of the invention, the conversion of the ester of the carbamic acid to give the isocyanate and alcohol must take place in solution from which the isocyanate and alcohol can be recovered without reaction of the isocyanate with the solvent.

The catalysts which can be used to obtain the desired increase in decomposition rates in accordance with this invention comprise heavy metals and inorganic or organic compounds of the heavy metals, particularly a heavy metal or inorganic or organic compound of molybdenum, vanadium, manganese, iron, cobalt, chromium, copper and nickel or mixtures or combinations thereof. The catalytic inorganic or organic compounds of the heavy metals may be a metal oxide, carbonyl, acetate, acetylacetonate, naphthenate, stearate or halide.

The heavy metal catalysts for use in this invention may be added to the reaction mixture as finely divided or powdered metal and may also be in the form of rods, sheets, bars, wire or metal shavings and the like which will provide a catalytic amount of the metal in solution at reaction conditions. Mixtures of the metals in the various forms may be used, e.g., a mixture of finely divided iron and copper. Combinations of the metals in one compound are also suitable for use in this invention, for example, cobalt molybdate, nickel molybdate, cobalt vanadate, manganese molybdate, copper molybdate, copper chromate and the like.

Suitable inorganic and organic compounds of the heavy metals which are effective catalysts are the metal oxides, carbonyls, acetates, acetylacetonates, naphthenates, stearates and halides which will dissolve under reaction conditions to give about 1 ppm by weight or higher of metal in solution.

Typical metal oxides which can be used are molybdenum oxide, vanadium pentoxide, manganese oxide (MnO, $Mn_2O_3$) iron oxide, chromic oxide and the like.

Organic complex compounds such as the acetylacetonates of the heavy metals may be used in this invention and include vanadium acetylacetonate, manganese acetylacetonate, cobalt acetylacetonate, ferric acetylacetonate, molybdenyl acetylacetonate, copper acetylacetonate and the like.

Salts of inorganic and organic acids such as iron chloride, iron bromide, cobaltous chloride, chromic chloride, copper chloride, vanadium naphthenate, manganese naphthenate, molybdenum naphthenate, cobalt naphthenate, cobalt acetate, chromium acetate, nickel naphthenate, nickel acetate, copper acetate, copper stearate, copper naphthenate, manganese acetate and the like may be used as catalysts in the process of this invention.

The catalyst system of this invention can be used in amounts varying within very wide limits as long as a catalytic quantity is employed. When using the heavy metal catalysts or mixtures or combinations thereof, the amount of metal in solution at reaction conditions may, for example, range from less than 1 ppm to 1000 ppm or higher.

The inorganic and organic compounds of the heavy metals exemplified hereinabove are characterized by being soluble under reaction conditions. Thus these catalysts will dissolve to give about 1 ppm by weight of metal in solution and can range up to 10,000 ppm or higher by weight of the metal. Preferably, however, the catalytic amount of metal is in the range of about 5 ppm to 500 ppm by weight based on the total reaction mixture.

In general, the catalysts used in the method of this invention will remain in the distillation residue after recovery of the reaction products and may be recovered for reuse by known techniques.

The following Examples are provided to illustrate the invention in further detail but these are not to be construed as limiting.

In the runs which follow except where noted differently the ester of the carbamic acid and solvent was placed in glass pot containing a glass covered magnetic stirrer, a thermometer, a nitrogen inlet extending below the liquid level and a 6 inch Vigreaux column was used. The overhead take off tube was connected to a trap maintained at room temperature and then to a set of two Dry-Ice traps to collect the alcohol. The column and overhead tube were not heated. In certain runs samples of pot materials were taken with a syringe inserted through a septum during reaction and were immediately diluted with a weighed amount of dried tetrahydrofuran to insure solubility of the products. In other runs the entire reaction product was analyzed. The samples or entire reaction product were analyzed by gas-liquid phase chromatography or analytical liquid chromatography for the isocyanate and for the mono- and/or dicarbamate by analytical liquid chromatography. In the representative runs which follow the rate of nitrogen flow is generally about 30 liters per hour.

EXAMPLE I

These runs show the effect of small amounts of molybdenum catalysts, added in the form of molybdenum hexacarbonyl, on the conversion of diethyl toluene-2,4-dicarbamate dissolved in n-hexadecane solvent at temperatures of 200°C. to 260°C.

TABLE I

Charge: 10g diethyl toluene-2,4-dicarbamate
50g n-hexadecane
$N_2$ = 30 l/hr.

| | Non-Catalyzed Reaction | | | | Catalyzed Reaction | | | |
|---|---|---|---|---|---|---|---|---|
| Temperature (°C.) | | 200 | | | | 200 | | |
| Catalyst | | none | | | | 0.0007g | Mo(CO)$_6$ | |
| Time (hrs.) | 1 | 2 | 3 | 4 | 1 | 2 | 3 | 4 |
| Mol % dicarbamate | 67 | 50 | 37 | 28 | 44 | 31 | 23 | 19 |
| Mol % monocarbamate | 28 | 40 | 48 | 52 | 47 | 57 | 59 | 56 |
| Mol % conversion of dicarbamate | 33 | 50 | 63 | 72 | 56 | 69 | 77 | 81 |
| Mol % conversion to TDI + by-products | 5 | 10 | 15 | 20 | 9 | 12 | 18 | 25 |
| Temperature (°C.) | | 230 | | | | 230 | | |
| Catalyst | | none | | | | 0.01g | Mo(CO)$_6$ | |
| Time (minutes) | 15 | 30 | 60 | 90 | 15 | 30 | 60 | 90 |
| Mol % dicarbamate | 53 | 39 | 23 | 14 | 24 | 12 | 7 | 2 |
| Mol % monocarbamate | 32 | 42 | 45 | 41 | 51 | 45 | 34 | 24 |
| Mol % conversion of dicarbamate | 47 | 61 | 77 | 86 | 76 | 88 | 93 | 98 |
| Mol % conversion to TDI + by-products | 15 | 19 | 32 | 45 | 25 | 43 | 59 | 74 |
| Temperature (°C.) | | 250 | | | | 250 | | |
| Catalyst | | none | | | | 0.01g | Mo(CO)$_6$ | |
| Time (minutes) | 15 | 30 | 60 | 90 | 15 | 30 | 60 | 90 |
| Mol % dicarbamate | 15 | 5 | 0 | 0 | 5 | 0 | 0 | 0 |
| Mol % monocarbamate | 49 | 39 | 24 | 15 | 40 | 22 | 11 | 6 |
| Mol % conversion of dicarbamate | 85 | 95 | 100 | 100 | 95 | 100 | 100 | 100 |
| Mol % conversion to TDI + by-products | 36 | 56 | 76 | 85 | 55 | 78 | 89 | 94 |
| Temperature (°C.) | | 260 | | | | 260 | | |
| Catalyst | | none | | | | 0.01g | Mo(CO)$_6$ | |
| Time (minutes) | 15 | 30 | 60 | 90 | 15 | 30 | 60 | 90 |
| Mol % dicarbamate | 7 | 2 | 0 | 0 | 4 | 0 | 0 | 0 |
| Mol % monocarbamate | 45 | 29 | 13 | 7 | 35 | 20 | 7 | 0 |
| Mol % conversion of dicarbamate | 93 | 98 | 100 | 100 | 96 | 100 | 100 | 100 |
| Mol % conversion to TDI + by-products | 48 | 69 | 87 | 93 | 61 | 80 | 93 | 100 |

EXAMPLE II

These runs are like those of Example I, except they show the increased conversions obtained using molybdenum, vanadium, manganese, cobalt and iron catalysts at 230°C. in the form of metal acetylacetonates and carbonyls.

TABLE II

| Time (minutes) | | 15 Mol % Conv. of dicarbamate | 60 Mol % conv. of dicarbamate | Mol % Conv. to TDI+by-products |
|---|---|---|---|---|
| Catalyst | (g.) | | | |
| None | — | 52 | 83 | 33 |
| Molybdenum hexacarbonyl | 0.0009 | 76 | 91 | 45 |
| Vanadium acetylacetonate | 0.0008 | 68 | 92 | 46 |
| Manganese acetylacetonate | 0.0009 | 73 | 91 | 44 |
| Cobalt acetylacetonate | 0.0008 | 68 | 92 | 45 |
| Ferric Acetylacetonate | 0.0008 | 73 | 93 | 50 |

EXAMPLE III

These runs are like those of Example 1 except they show the increased conversions obtained using manganese, vanadium, cobalt and iron catalysts at 250°C. in the form of acetylacetonates.

TABLE III

| Time (minutes) | | 30 Mol % Conv. of dicarbamate | Mol % Conv. to TDI+by-products | 60 Mol % Conv. to TDI+by-products |
|---|---|---|---|---|
| Catalyst | (g.) | | | |
| None | — | 91 | 42 | 69 |
| Manganese acetylacetonate | 0.001 | 95 | 56 | 77 |
| Vanadium acetylacetonate | 0.001 | 97 | 62 | 81 |
| Cobalt acetylacetonate | 0.001 | 97 | 62 | 80 |
| Ferric acetylacetonate | 0.001 | 98 | 62 | 83 |

EXAMPLE IV

These runs show the results where the decompositions were run for a two hour period and the entire product worked up and analyzed. These results show that metal oxides also can be utilized in the process of this invention. Runs were carried out at 250°C. using 10 g. diethyl toluene-2,4-dicarbamate and 50 g. n-hexadecane solvent with 30 1/hr. $N_2$ flowing through the reaction mixture.

TABLE IV

| Catalyst | (g) | Mol % TDI | Mol % Monocarbamate[a] | Mol % Dicarbamate |
|---|---|---|---|---|
| None | — | 62 | 37 | 3 |
| $Cr_2O_3$ | 0.01 | 71 | 29 | 2 |
| $Fe_2O_3$ | 0.01 | 72 | 28 | 1 |
| $Mo(CO)_6$ | 0.0007 | 82 | 15 | 0 |

[a]Reported analysis for monocarbamate slightly high due to small amount of recombination with residual ethanol prior to analysis.

EXAMPLE V

These runs show comparatively the increased conversions obtained using various forms of iron as the heavy metal catalyst. The runs were carried out at 250°C. using 10 g. of diethyl toluene-2,4-dicarbamate and 50 g. n-hexadecane solvent with 30 1/hr. nitrogen flowing through the reaction mixture for a two hour period and further shows results utilizing iron oxide.

TABLE V

| Catalyst | (g.) | Mole% TDI | Mole% Monocarbamate | Mole% Dicarbamate |
|---|---|---|---|---|
| None[1] | — | 68.3 | 18.8 | 0.8 |
| Carbon Steel Rod[2] | 2 | 75.5 | 9.5 | 0.4 |

TABLE V-continued

| Catalyst | (g.) | Mole% TDI | Mole% Monocarbamate | Mole% Dicarbamate |
|---|---|---|---|---|
| Carbon Steel Shavings | 1 | 76.2 | 8.3 | — |
| Iron Powder | 0.01 | 75.4 | 6.0 | — |
| $Fe_2O_3$ | 0.01 | 77.2 | 8.1 | 0.1 |

[1]An average of 4 runs with no catalyst under the same conditions.
[2]Glass covered stirrer replaced with a carbon steel stirring rod.

EXAMPLE VI

These runs are like those of Example V, except they were carried out at 265°C. for a 1 hour period and further show the results using iron oxide.

TABLE VI

| Catalyst | (g.) | Mole% TDI | Mole% Monocarbamate | Mole% Dicarbamate |
|---|---|---|---|---|
| None | — | 66.3 | 18.8 | 0.2 |
| Carbon Steel Rod[1] | 2 | 79.4 | 8.2 | — |
| $Fe_2O_3$ | 0.01 | 82.7 | 7.7 | 0.6 |

[1]Glass covered stirrer replaced with a carbon steel stirring rod.

We claim:
1. A method for the production of isocyanates from esters of carbamic acids having the formula $R(NHCOOR')_x$ or $(RNHCOO)_xR'$ wherein R is a substituted or unsubstituted mono-, di- or trivalent organic radical selected from the group consisting of a saturated or mono-olefinic unsaturated straight or branched chain aliphatic or cycloaliphatic radical containing not more than 32 carbon atoms, an alkoxyalkyl radical having not more than 32 carbon atoms, an aryl radical, an aralkyl radical, and an alkaryl radical containing 1 to 5 rings; R' is a substituted or unsubstituted mono-, di- or trivalent radical selected from the group consisting of a saturated or monoolefinic unsaturated straight or branched chain aliphatic or cycloaliphatic radical containing not more than 32 carbon atoms, an alkoxyalkyl radical having not more than 32 carbon atoms, an aryl radical, an aralkyl radical and an alkaryl radical containing 1 to 3 rings; and x is 1, 2 or 3, each R or R' being the same or different, respectively where x is 2 or 3, which comprises thermally decomposing said ester at a temperature in the range of from 175°C. to 350°C. in the presence of a heavy metal or heavy metal compound catalyst while said ester is dissolved in an inert solvent to produce the isocyanate and alcohol, said solvent being characterized as a compound which is (a) solvent for said ester, (b) liquid and stable at said decomposition reaction temperature and (c) non-reactive with said isocyanate produced in said thermal decomposition reaction and is a compound or mixture of compounds selected from the group consisting of aliphatic, cycloaliphatic or aromatic hydrocarbons, substituted hydrocarbons, oxygenated compounds selected from the group consisting of ethers, ketones and esters and the sulfur analogues of said oxygenated compounds and separately recovering the isocyanate and alcohol.

2. The method according to claim 1 wherein said solvent is selected from the group consisting of aromatic hydrocarbons having from 1 to 3 rings, the alkyl benzenes having from 1 to 15 carbon atoms in the alkyl group, the chloro substituted derivatives of said aromatic hydrocarbons and the mono-nitro substituted derivatives of said hydrocarbons.

3. The method according to claim 1 wherein said solvent is selected from the group consisting of aliphatic hydrocarbons having from 4 to 32 carbon atoms, the halo-substituted derivatives of said aliphatic hydrocarbons and the mono-nitro substituted derivatives of said aliphatic hydrocarbons.

4. The method according to claim 3 wherein said solvent is n-hexadecane.

5. The method according to claim 1 wherein the metal of the said catalyst is selected from the group consisting of molybdenum, vanadium, manganese, iron, cobalt, chromium, copper and nickel.

6. A method according to claim 1 wherein the heavy metal compound is a metal oxide, carbonyl, acetate, acetylacetonate, naphthenate, stearate or halide.

7. The method according to claim 5 wherein R is selected from the group consisting of mono-, di- and trivalent unsubstituted organic aliphatic radicals containing up to 18 carbon atoms, halo or mono-nitro substituted mono-, di- or trivalent organic aliphatic radicals containing up to 18 carbon atoms, mono-, di and trivalent cycloaliphatic radicals containing from 5 to 7 carbon atoms, mono-unsaturated cycloaliphatic radicals having from 5 to 7 carbon atoms and substituted cycloaliphatic radicals wherein the substituent is a lower alkyl radical having 1 to 4 carbon atoms, a nitro radical or a chloro radical.

8. The method according to claim 5 wherein the R is selected from the group consisting of mono-, di- or trivalent unsubstituted aryl radicals having from 1 to 5 rings, aryl radicals substituted with 1 or more alkyl groups having from 1 to 4 nitro groups or halo groups, and aralkyl radicals wherein the alkyl portion contains from 1 to 4 carbon atoms and the aryl contains from 1 to 3 rings.

9. The method according to claim 5 wherein the R' is selected from the group consisting of mono-, di- and trivalent unsubstituted organic aliphatic radicals containing up to 18 carbon atoms, halo or mono-nitro substituted mono-, di- or trivalent organic aliphatic radicals containing up to 18 carbon atoms and alkoxyalkyl radicals containing up to 18 carbon atoms.

10. The method according to claim 5 wherein said decomposition is carried out at a temperature in the range of from 200°C. to 300°C. and the solvent is a compound or mixture of compounds selected from the group consisting of aliphatic, cycloaliphatic or aromatic hydrocarbons, substituted hydrocarbons, oxygenated compounds selected from the group consisting of ethers, ketones and esters and the sulfur analogues of said oxygenated compounds.

11. A method according to claim 10 wherein said decomposition is carried out at a temperature in the range of from 230°C. to 285°C. and the catalyst is a heavy metal oxide, carbonyl, acetate, acetylacetonate, naphthenate, stearate or halide.

12. The method according to claim 10 wherein said solvent is selected from the group consisting of aromatic hydrocarbons having from 1 to 3 rings, the alkyl benzenes having from 1 to 15 carbon atoms in the alkyl group, the chloro-substituted derivatives of said aromatic hydrocarbons and the mono-nitro substituted derivatives of said hydrocarbons.

13. The method according to claim 10 wherein said solvent is selected from the group consisting of aliphatic hydrocarbons having from 4 to 32 carbon atoms, the halo-substituted derivatives of said aliphatic hydrocarbons and the mono-nitro substituted derivatives of said aliphatic hydrocarbons.

14. The method according to claim 13 wherein said solvent is n-hexadecane.

15. A method for the production of a toluene diisocyanate from an ester of carbamic acid said ester being selected from the group consisting of dimethyl toluene-2,4-dicarbamate, diethyl toluene-2,4-dicarbamate, dipropyl toluene-2,4-dicarbamate, diisopropyl toluene-2,4-dicarbamate, dibutyl toluene-2,4-dicarbamate, diamyl toluene-2,4-dicarbamate, dihexyl toluene-2,4-dicarbamate, diphenyl toluene-2,4-dicarbamate, di(phenylmethyl)toluene-2,4-dicarbamate, dinaphthyl toluene-2,4-dicarbamate, di(ethoxyethyl)toluene-2,4-dicarbamate and the corresponding esters of toluene-2,6-dicarbamate, which comprises thermally decomposing said ester at a temperature in the range of from 175°C. to 350°C. in the presence of a heavy metal or heavy metal compound catalyst while said ester is dissolved in an inert solvent to produce the toluene diisocyanate and the corresponding alcohol, said solvent being characterized as a compound which is (a) solvent for said ester, (b) liquid and stable at said decomposition reaction temperature and (c) non-reactive with said isocyanate produced in said thermal decomposition reaction and is a compound or mixture of compounds selected from the group consisting of aliphatic, cycloaliphatic or aromatic hydrocarbons, substituted hydrocarbons, oxygenated compounds selected from the group consisting of ethers, ketones and esters and the sulfur analogues of said oxygenated compounds; and separately recovering the isocyanate and alcohol.

16. The method according to claim 15 wherein said toluene diisocyanate is toluene-2,4-diisocyanate.

17. The method according to claim 15 wherein said solvent is a compound or mixture of compounds selected from the group consisting of aliphatic, cycloaliphatic or aromatic hydrocarbons, substituted hydrocarbons, alkyl benzenes having from 1 to 15 carbon atoms in the alkyl group, oxygenated compounds selected from the group consisting of ethers, ketones and esters and the sulfur analogues of said oxygenated compounds, the metal of said catalyst being selected from the group consisting of molybdenum, vanadium, manganese, iron, cobalt, chromium, copper and nickel.

18. The method according to claim 17 wherein the solvent is n-hexadecane.

19. A method according to claim 5 wherein the heavy metal compound is a metal oxide, carbonyl, acetate, acetylacetonate, naphthenate, stearate or halide.

20. A method according to claim 15 wherein said toluene diisocyanate is toluene-2,6-diisocyanate.

* * * * *